UNITED STATES PATENT OFFICE.

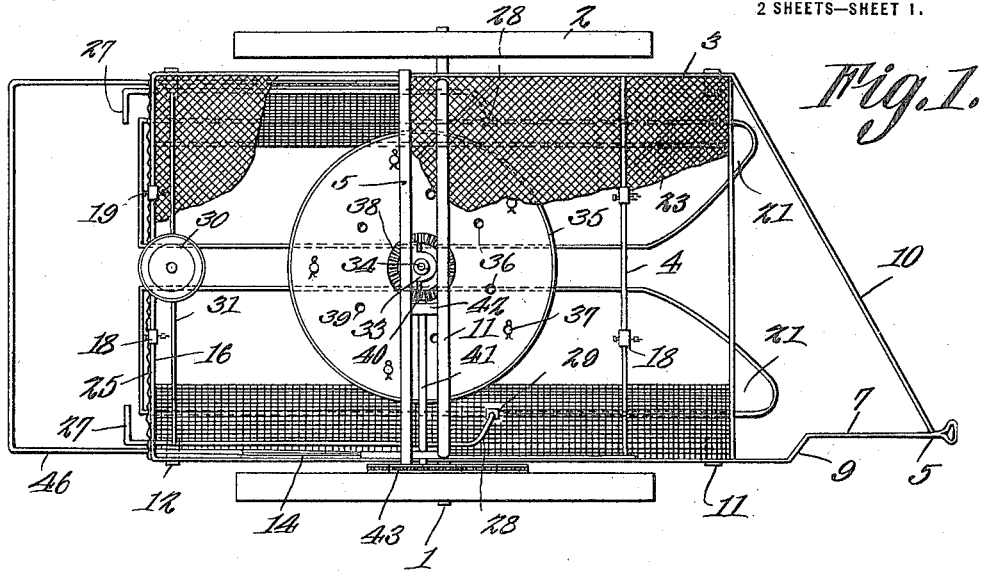

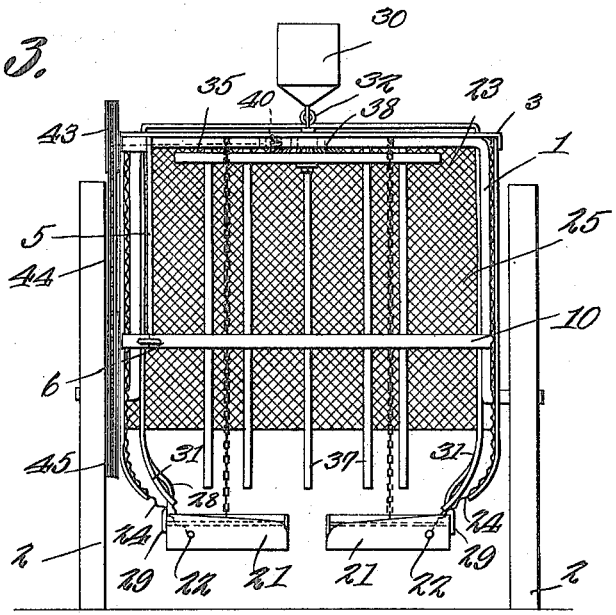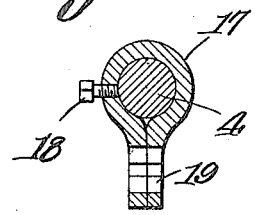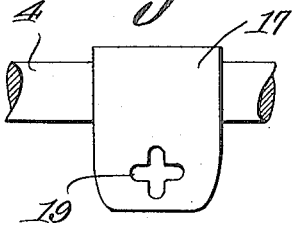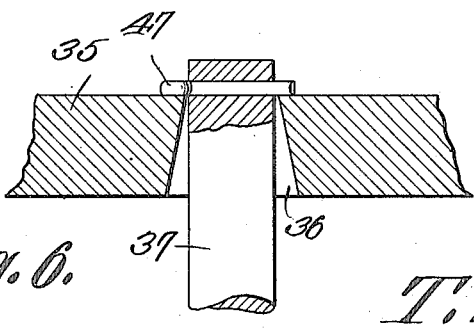

THOMAS WILLIAM TOWNSEND, OF COLUMBUS, MISSISSIPPI.

BOLL-WEEVIL EXTERMINATOR.

1,202,612.  Specification of Letters Patent.  Patented Oct. 24, 1916.

Application filed November 18, 1915. Serial No. 62,173.

*To all whom it may concern:*

Be it known that I, THOMAS W. TOWNSEND, a citizen of the United States, residing at Columbus, in the county of Lowndes and State of Mississippi, have invented a new and useful Boll-Weevil Exterminator, of which the following is a specification.

The device forming the subject matter of this application is a boll weevil exterminator, and one object of the invention is to improve the construction of the beater.

Another object of the invention is to improve the construction of the connecting pans and, specifically, to provide novel means whereby the positions of the pans may be adjusted.

Another object of the invention is to provide novel means whereby the insects removed from the plants by the beater will of a certainty be directed into the pans.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings, Figure 1 shows in top plan, a boll weevil exterminator, constructed in accordance with the present invention, parts being broken away; Fig. 2 is a side elevation; Fig. 3 is a front elevation; Fig. 4 is a fragmental cross section showing the means whereby the pans are suspended; Fig. 5 is a fragmental elevation showing the structure delineated in Fig. 4; Fig. 6 is a fragmental cross section showing a portion of the beater.

In carrying out the present invention there is provided a supporting structure embodying an arched axle 1 upon the ends of which are mounted ground wheels 2. Connected with the upper portion of the arched axle 1 is a main frame 3, the same being disposed horizontally and being of approximately rectangular outline. Extended across the main frame 3 is a front frame 4. An intermediate brace 5 connects the side portions of the main frame 3, at a point slightly to the rear of the arched axle 1.

The invention comprises a draft frame denoted by the numeral 6 and disposed vertically adjacent the right hand side of the machine, the upper bar 7 of the draft frame 6 constituting, if desired, a continuation of one of the side bars of the main frame 3. The draft frame 6 embodies a lower bar 8 which may be extended rearwardly, and may be connected with one side of the arched axle 1. The draft frame 6 is offset slightly as shown at 9, so as to position the draft properly with respect to the right hand side of the vehicle, because this side of the vehicle is the heavier side thereof, since parts of the operating mechanism, as will be described hereinafter, are located at the right hand side of the structure. The draft frame 6 may be sustained by a lateral brace 10. Depending from the main frame 3 near to the forward end thereof are arms 11 which may be connected to the bar 8 of the draft frame. Depending from the main frame 3 adjacent the rear end thereof are arms 12. Diagonal supporting bars 14 extend between the side portions of the main frame 3 and the axle 1, braces 15 extending between the rearmost supporting bars 14 and the rear arms 12. In order to steady and direct the machine while the same is being drawn over the ground by means of the draft frame 6, an upwardly inclined loop-shaped handle 46 is connected with the parts 12 and 14, as will be understood clearly from Figs. 2 and 1.

Mounted to move transversely of the line of advance of the machine on the brace 4 and on the rear end member 16 of the frame 3 are riders 17 which may be held in place by means of set screws 18. The riders 17 may be provided, as shown in Fig. 5, with cruciform openings 19 adapted to receive the adjustment, chains 20, the lower ends of which are secured to spaced collecting pans 21. Extended longitudinally of the pans 21 from one end thereof to the other are rods 22. The frame 3 supports an arched or an inverted trough-shaped covering 23, preferably fashioned from yieldable netting, the lower edges 24 of this netting being inclined inwardly, toward the longitudinal center of the machine, so as to enter within the trough-shaped pans 21, the lower edges 24 of the netting being secured to the rods 22 which extend longitudinally of the pans. The rear end of the machine is closed in by a curtain 25, preferably made of netting. The curtain 25 is suspended at its upper edge from the rear member 16 of the main frame 3, the lower edge of the curtain 25 being free, so that it may swing rearwardly. The curtain 25 preferably is of a less length than the side portions of the netting or covering 23.

Journaled for rotation on the arms 12 and on the depending side portions of the axle 1 are forwardly and downwardly inclined shafts 26 provided at their rear ends with rectangular handles 27, the lower, forward ends of the shafts 26 terminating in arms 28 having spaced fingers 29 which straddle loosely, the outer edges of the pans 21. Mounted on the rear portion of the main frame 3 is a tank 30 communicating with depending pipes 31 discharging into the pans 21 as will be understood from Fig. 3, the flow of liquid from the tank 30 into the pans 21 being controlled by a valve 32 located adjacent the tank 30.

As Fig. 1 will show, a bearing 33 is connected with the intermediate brace 5 of the main frame 3 and in the bearing 33 is journaled for rotation a short vertical shaft 34. The shaft 34 constitutes a part of the means whereby the beater is rotated, the beater embodying a wheel or head 35, constructed in any desired manner, and secured to the shaft 34. The head 35 of the beater is horizontally disposed and is provided with any desired number of openings 36, receiving spokes 37, the spokes being loosely mounted in the openings, so that the spokes may have a slight gyratory or wabbling movement. Cotter pins 47 are inserted through openings in the upper ends of the spokes 37 and coöperate with the upper face of the head 35 of the beater to prevent a downward movement of the spokes. In the present embodiment of the invention, five spokes are disposed in a circle in the head 35, but any desired number of openings 36 may be fashioned in the head and any selected number of spokes may be employed. Attached to the shaft 34 is a horizontally disposed beveled gear wheel 38, engaged by a vertical beveled pinion 40 carried by the inner end of a horizontal shaft 41 journaled in one side of the main frame 3 and in a bearing 42 connecting the top of the axle 1 with the intermediate brace 5 and located relatively near to the longitudinal center of the machine. Secured to the outer end of the shaft 41 is a sprocket wheel 43 about which is trained a sprocket chain 44 engaged with a sprocket wheel 45 connected with one of the ground wheels 2 to rotate therewith.

By manipulating the valve 32, the oil may be discharged into the pans 21 from the tank 30 by way of the pipes 31. The insects collected in the pans 21 may be removed at any time and burned.

The positions of the pans 21 with respect to each other, transversely of the line of advance of the machine, may be adjusted by shifting the riders 17 toward and away from each other along the bars 4 and 16, the riders being held in place by means of the set screws 18. The positions of the pans 21 vertically considered may be adjusted by engaging the successive links of the chains 20 in the openings 19 of the riders 17. At any time, the operator of the machine may shift the pans 21 toward and away from each other by rotating the shafts 26 through the instrumentality of the handles 27, the crank arms 28 on the forward ends of the shafts engaging the pans in a manner set forth hereinbefore.

When the beating mechanism is in operation, the insects and the punctured squares are detached and caught by the netting covering 23, it being noted, as clearly shown in Fig. 3 that the lower edges of the covering serve to direct the dislodged material into the pans 21. The rear curtain 25 is preferably somewhat shorter than the side portions of the covering 23, to permit the plants to pass out of the contour of the machine. However, since the curtain 25 is adapted to swing rearwardly, the curtain will conform readily to the plants and will aid in brushing the plants as the same finally pass out of the machine.

When the ground wheels 2 are rotated, one ground wheel will rotate the sprocket wheel 45, the latter through the medium of the chain 44, rotating the sprocket wheel 43 and the shaft 41, the pinion 40 on the shaft meshing into the beveled gear wheel 38 on the upright shaft 34 and imparting a rotation to the head 35, the spokes 37 thus being carried around in an orbit and imparting a knocking or beating action to the plants.

Attention is directed to the fact that the spokes 37 are mounted loosely in the head 35, so that the spokes may swing, as they travel in an orbit. This movement will be found peculiarly efficient in beating the plants and in removing the weevils and punctured squares therefrom.

Having thus described the invention, what is claimed is—

1. In a device of the class described, a supporting structure; a beater carried thereby; opposed pans suspended from the supporting structure; rods lying within the pans; a covering carried by the supporting structure and housing the beater, the lower, longitudinal edges of the covering being assembled with the rods; and means for operating the beater.

2. In a device of the class described, a supporting structure; a pair of pans; riders mounted to slide on the supporting structure transversely of the line of advance of the supporting structure; means for holding the riders in adjusted positions; suspension elements the lower ends of which are assembled with the pans; means for connecting the upper ends of the suspension elements with the riders adjustably, thereby to adjust the pans vertically; shafts journaled on the supporting structure, the shafts being operatively connected at their forward ends with the pans to adjust the space between the pans, and the rear ends of the shafts being provided with means whereby a rotation may be imparted to the shafts.

3. A device of the class described embodying beater spokes mounted to travel in an orbit, the lower end of each spoke having limited universal movement in a horizontal plane.

4. In a device of the class described, a supporting structure; a ground wheel journaled thereon; a horizontally disposed beater head journaled on the supporting structure; means for operatively connecting the beater head with the supporting ground wheel; a freely swinging, depending spoke carried by the beater head; a pair of pans located below the spoke; means for suspending the pans from the supporting structure for movement toward and away from each other, and for independent vertical adjustment; and means under the control of an operator for imparting movement to the respective pans, each independently of the other, toward and away from the line of advance of the supporting structure.

In testimony that I claim the foregoing as my own, I have hereto affixed my signature in the presence of two witnesses.

THOMAS WILLIAM TOWNSEND.

Witnesses:
V. B. IMES,
E. V. KUYKENDALL.

Copies of this patent may be obtained for five cents each, by addressing the "Commissioner of Patents, Washington, D. C."